(12) United States Patent
Natanzon et al.

(10) Patent No.: US 9,535,800 B1
(45) Date of Patent: Jan. 3, 2017

(54) CONCURRENT DATA RECOVERY AND INPUT/OUTPUT PROCESSING

(71) Applicant: EMC Corporation, Hopkinton, MA (US)

(72) Inventors: Assaf Natanzon, Tel Aviv (IL); Kadir Ozdemir, San Jose, CA (US); Anestis Panidis, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 14/502,518

(22) Filed: Sep. 30, 2014

(51) Int. Cl.
*G06F 11/00* (2006.01)
*G06F 11/14* (2006.01)
*G06F 3/06* (2006.01)

(52) U.S. Cl.
CPC ......... *G06F 11/1469* (2013.01); *G06F 3/0619* (2013.01); *G06F 3/0631* (2013.01); *G06F 3/0647* (2013.01); *G06F 3/0683* (2013.01)

(58) Field of Classification Search
USPC ........................................................ 714/6.3
See application file for complete search history.

(56) References Cited

U.S. PATENT DOCUMENTS

| | | | | |
|---|---|---|---|---|
| 6,721,902 B1* | 4/2004 | Cochran | ............. | G06F 11/1456 714/13 |
| 6,978,280 B1* | 12/2005 | Cochran | ............. | G06F 11/1458 |
| 7,007,143 B2* | 2/2006 | Cochran | ............... | G06F 3/0601 711/111 |
| 7,660,919 B2* | 2/2010 | Flynn, Jr. | ............... | G06F 3/0607 710/40 |
| 2004/0193945 A1* | 9/2004 | Eguchi | ................... | G06F 11/142 714/6.1 |
| 2008/0086608 A1* | 4/2008 | Kano | .................... | G06F 3/0607 711/162 |
| 2012/0266011 A1* | 10/2012 | Storer | ................... | G06F 11/008 714/1 |
| 2014/0195480 A1* | 7/2014 | Talagala | .............. | G06F 12/0804 707/610 |
| 2014/0195850 A1* | 7/2014 | Patel | ...................... | G06F 13/00 714/16 |

* cited by examiner

*Primary Examiner* — Amine Riad
(74) *Attorney, Agent, or Firm* — Staniford Tomita LLP

(57) ABSTRACT

A method, article of manufacture, and apparatus for restoring LUs from a backup is discussed. In an embodiment, a primary storage system may continue to process IOs while the LU is being restored.

13 Claims, 4 Drawing Sheets

CONCURRENT DATA RECOVERY AND INPUT/OUTPUT PROCESSING

CROSS REFERENCE TO RELATED APPLICATIONS

This application is related to co-pending U.S. patent application Ser. No. 14/108,002 for INITIALIZING BACKUP SNAPSHOTS ON DEDUPLICATED STORAGE, U.S. patent application Ser. No. 14/108,021 for MAINTAINING BACKUP SNAPSHOT ON DEDUPLICATED STORAGE USING CONTINUOUS REPLICATION, U.S. patent application Ser. No. 14/108,032 for POINT-IN-TIME RECOVERY ON DEDUPLICATED STORAGE, U.S. patent application Ser. No. 14/108,053 for MAINTAINING POINT-IN-TIME GRANULARITY FOR BACKUP SNAPSHOTS, U.S. patent application Ser. No. 14/108,060 for MAINTAINING BACKUP SNAPSHOTS USING CONTINUOUS REPLICATION FOR MULTIPLE SOURCES, U.S. patent application Ser. No. 14/227,208 for SYNTHESIZING VIRTUAL MACHINE DISK BACKUPS, U.S. patent application Ser. No. 14/225,089 for RECOVERING CORRUPT VIRTUAL MACHINE DISKS, U.S. patent application Ser. No. 14/225,069 for ALIGNMENT FIXING ON A STORAGE SYSTEM DURING CONTINUOUS DATA REPLICATION TO DEDUPLICATED STORAGE, U.S. patent application Ser. No. 14/225,104 for ALIGNMENT FIXING ON A DATA PROTECTION SYSTEM DURING CONTINUOUS DATA REPLICATION TO DEDUPLICATED STORAGE, and U.S. patent application Ser. No. 14/108,072 for RECOVERING CORRUPT STORAGE SYSTEMS, all hereby incorporated by reference for all purposes.

FIELD OF THE INVENTION

This invention relates generally to backup and recovery systems, and more particularly to systems and methods for managing IO operations while recovering data from a backup system.

BACKGROUND OF THE INVENTION

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include backup drives for storing organizational production site data on a periodic basis. Such systems suffer from several drawbacks. First, they may require a system shutdown during backup since the data being backed up cannot be used during the backup operation. Second, they limit the points in time to which the production site can recover. For example, if data is backed up on a daily basis, there may be several hours of lost data in the event of a disaster. Third, the data recovery process itself may take a long time.

Another conventional data protection system uses data replication, by creating a copy of the organization's production site data on a secondary backup storage system, and updating the backup with changes. The backup storage system may be situated in the same physical location as the production storage system, or in a physically remote location.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
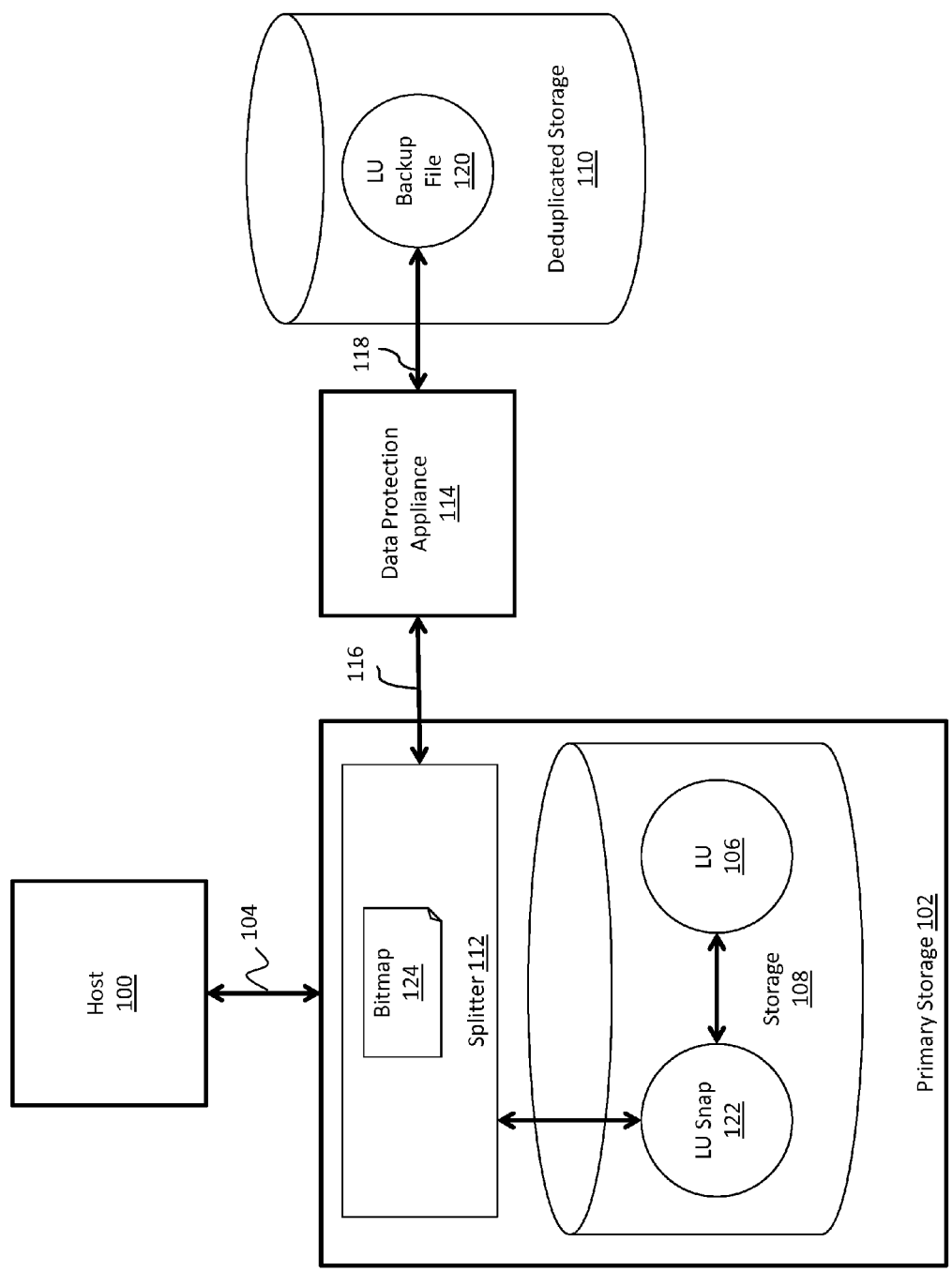
FIG. 1 depicts a data backup and recovery system consistent with an embodiment of the present disclosure.

A detailed description of one or more embodiments of the invention is provided below along with accompanying figures that illustrate the principles of the invention. While the invention is described in conjunction with such embodiment (s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses systems, methods, and processes for processing IOs destined for a LU on primary storage while the LU is being recovered from a backup. Occasionally, a LU may become logically corrupt and a user may desire to restore the LU from a backup system. The user may also, however, desire to continue to send IOs to the LU while it is being restored. There is therefore a risk that a user may accidentally read incorrect data from the corrupt LU or have new data written to the LU overwritten by the restore process. The present disclosure provides a process and system that allows the user to continue sending IOs to the LU while it is being restored from backup.

The following non-limiting definitions may be helpful in understanding the specification and claims:

BACKUP SITE—may be a facility where replicated production site data is stored; the backup site may be located in a remote site or at the same location as the production site; a backup site may be a virtual or physical site.

CDP—Continuous Data Protection, may refer to a full replica of a volume or a set of volumes along with a journal which allows any point in time access, the CDP copy is at the same site, and maybe the same storage array of the production site.

DATA PROTECTION APPLIANCE ("DPA")—may be a computer or a cluster of computers, or a set of processes that serve as a data protection appliance, responsible for data protection services including inter alia data replication of a storage system, and journaling of IO requests issued by a host computer to the storage system. The DPA may be a physical device, a virtual device running, or may be a combination of a virtual and physical device.

HOST—may be at least one computer or networks of computers that runs at least one data processing application that issues IO requests to one or more storage systems; a host is an initiator with a SAN; a host may be a virtual machine.

HOST DEVICE—may be an internal interface in a host to a logical storage unit.

IMAGE—may be a copy of a logical storage unit at a specific point-in-time.

INITIATOR—may be a node in a SAN that issues IO requests.

IO—may mean a input, output, read, read request, write, write request, or any combination thereof.

JOURNAL—may be a record of write transactions issued to a storage system. A journal may be used to maintain a duplicate storage system, and to rollback the duplicate storage system to a previous point-in-time.

LOGICAL UNIT ("LU")—may be a logical entity provided by a storage system for accessing data from the storage system.

LUN—may be a logical unit number for identifying a logical unit. May also refer to one or more virtual disks or virtual LUNs, which may correspond to one or more Virtual Machines. As used herein, LUN and LU may be used interchangeably to refer to a LU.

PHYSICAL STORAGE UNIT—may be a physical entity, such as a disk or an array of disks, for storing data in storage locations that can be accessed by address.

PRODUCTION SITE—may be a facility where one or more host computers run data processing applications that write data to a storage system and read data from the storage system; may be a virtual or physical site.

RPA—may be replication protection appliance, and is another name for DPA. An RPA may be a virtual DPA or a physical DPA.

SAN—may be a storage area network of nodes that send and receive 10 and other requests, each node in the network being an initiator or a target, or both an initiator and a target.

SOURCE SIDE—may be a transmitter of data within a data replication workflow. During normal operation a production site is the source side, and during data recovery a backup site is the source side. Source side may be a virtual or physical site.

SNAPSHOT—a snapshot may refer to an image or differential representations of an image, i.e. the snapshot may have pointers to the original volume, and may point to log volumes for changed locations. Snapshots may be combined into a snapshot array, which may represent different images over a time period.

SPLITTER/PROTECTION AGENT—may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

STORAGE SYSTEM—may be a SAN entity that provides multiple logical units for access by multiple SAN initiators.

STREAMING—may mean transmitting data in real time, from a source to a destination, as the data is read or created.

SYNTHESIZE—may mean creating a new file using pointers from existing files, without actually copying the referenced data. For example, a new file representing a volume at a points-in-time may be created using pointers to a file representing a previous point-in-time, as well pointers to journal representing changes to the volume TARGET—may be a node in a SAN that replies to IO requests.

TARGET SIDE—may be a receiver of data within a data replication workflow; during normal operation a back site is the target side, and during data recovery a production site is the target side; may be a virtual or physical site.

VIRTUAL VOLUME—may be a volume which is exposed to host by a virtualization layer, the virtual volume may be spanned across more than one site and or volumes.

VIRTUAL RPA (vRPA)/VIRTUAL DPA (vDPA)—may be an DPA running in a VM (Virtual Machine).

WAN—may be a wide area network that connects local networks and enables them to communicate with one another, such as the Internet.

FIG. 1 depicts a system consistent with an embodiment of the present disclosure. Host 100 may communicate with primary storage 102 via communications channel 104. In some embodiments, this communications channel may be a network connection. Host 100 may transmit IOs to, and receive responses from, primary storage 102. In some embodiments, the IOs may be destined for LU 106 residing on storage 108. Occasionally, however, LU 106 may become logically corrupt and need to be restored from backup. LU 106 may have one or more backups residing on a deduplicated storage device, such as deduplicated storage 110, enabling point-in-time recovery as discussed in the cross-referenced patent applications.

LU 106 may have one or more point-in-time backups residing on deduplicated storage 110. In some embodiments, the system depicted in FIG. 1 may be a continuous data protection system. As IOs are communicated to primary storage 102, they may be intercepted by splitter 112 and communicated to deduplicated storage 110 via data protection appliance 114. At the same time, splitter 112 may communicate the IOs to storage 108 for processing. In an embodiment, communications between splitter 112, data protection appliance 114, and deduplicated storage 110 occur over communication channels 116 and 118, which may be network connections. IOs received at deduplicated storage 110 may be journaled and/or synthesized into backup files, thereby permitting point-in-time backups for point-in-time recovery. These processes are discussed in detail in the cross-referenced patent applications. Additionally or alternatively, point-in-time backups may be created on the backup storage using other technologies, such as snapshot shipping.

An embodiment, host 100 or a separate system may send a command to primary storage 102 to recover LU 106. This may be as a result of host 100 observing that LU 106 is logically corrupt. Additionally or alternatively, primary storage 102 may observe LU 106 is corrupt as part of a maintenance or other process. This recovery command may be communicated to data protection appliance 114 and deduplicated storage 110.

In some embodiments, the recovery request may be for a specified point-in-time, such as the latest point-in-time or the present. Since IOs are continuously transmitted to data protection appliance 114 and deduplicated storage 110, the corrupt data on primary storage 102 may not be corrupt on deduplicated storage 110. If the corruption is a logical corruption at an older point-in-time, the deduplicated storage may contain data from before the logical corruption occurred. The recovery request communicated to deduplicated storage 110 may include metadata for LU 106, such as the latest changes applied to LU 106 that may not have been applied to the deduplication storage. This LU metadata may be compared to backup metadata, such as metadata stored in a journal file or other data object, to identify differences between LU 106 and the specified point-in-time data on deduplicated storage 110. Once the differences are identified, they may be exposed on deduplicated storage 110 as LU backup file 120.

After the LU backup file is exposed, a recovery process may begin to restore corrupt data in LU 106 from LU backup file 120. A user may, however, wish to continue transmitting IOs to primary storage 102. For example, primary storage 102 may contain critical data and a user may be unable to wait for the backup process to complete. The present system allows primary storage 102 to continue to process the IOs while the LU is recovered from a backup.

In an embodiment, the differences identified in the LU backup file may be communicated to bitmap 124 by data protection appliance 114. Bitmap 124 may comprise a map identifying the regions of LU 106 that are different than LU backup file 120. For example, LU 106 may be divided into 8 kb regions. Each region may have an associated bit in bitmap 124. If the region is different in LU 106 than on deduplicated storage 110, the associated bit may be set to 1. If the region is the same, the bit may be 0. Similarly, 0 may indicate a difference and 1 may indicate the regions are the same. Additionally or alternatively, regions may be larger or smaller than 8 kb, which is only used as an example. Bitmap 124 therefore allows splitter 112 to quickly identify which areas of LU 106 are corrupt (i.e. different) and which areas are not (i.e. the same).

Figure 2:
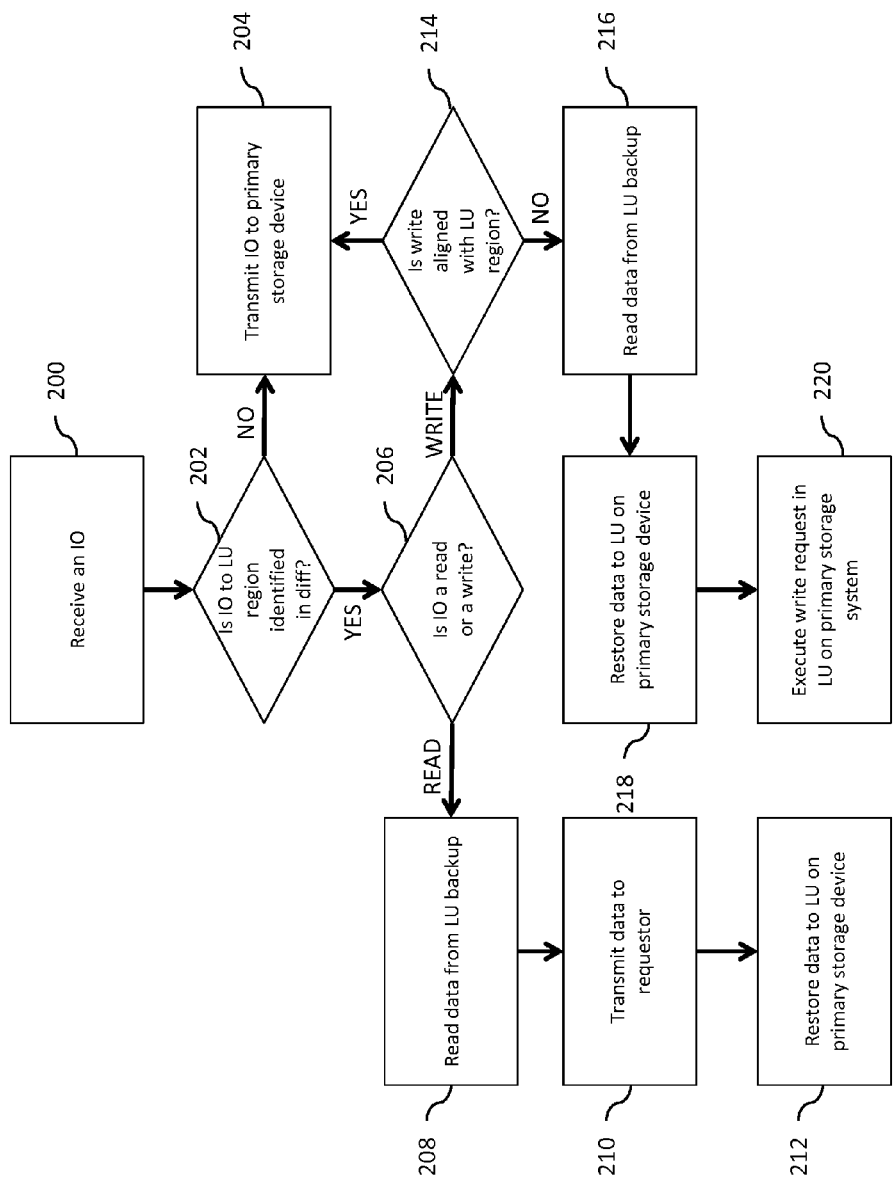
FIG. 2 depicts process for applying an JO to a LU consistent with an embodiment of the present disclosure.

Turning now to FIG. 2, a process for applying IOs is discussed. At block 200, an IO may be received. In an embodiment, the IO may be received at a primary storage system from a host. Additionally or alternatively, the IO may be received at a splitter in communication with both a data protection appliance and a storage device in the primary storage system.

At 202, a check is made to determine if the IO is for an LU region identified in a difference. This difference could be, for example, the difference identified between LU 106 and the LU data on deduplicated storage, as discussed above. If the IO is to a region identified as different, the IO may be directed to a region that is corrupt. If the IO is to a region that is not different, the IO may be directed to a region that is not corrupt. In an embodiment, consulting a mapping mechanism, such as bitmap 124, makes the check at 202.

If the IO is to a region that is not identified as different (i.e. the region is not corrupt), it may be transmitted to a primary storage device, such as storage 108, at block 204. Once received at the primary storage device, the IO may be applied to the LU. Since the region is not corrupt, there is no risk that a restore process will overwrite it. Similarly, there is no risk that the read data will be incorrect.

If the IO is to a region that is identified in the difference, the region may be corrupt and the process may continue to 206. At 206, another check is made to determine whether the IO is a read or a write. Reads and writes are different operations. Each may be treated differently to ensure the correct data is returned for a read, and data is not accidently overwritten for a write.

If the IO is a read, the process may continue to block 208. At 208, the data associated with the region is read from the LU backup rather than the LU itself. This is because the region may be corrupt, and the data in the LU may be incorrect. The LU backup, however, may contain the correct data. The data may be read from the LU backup by directing the IO to a backup appliance, such as backup appliance 114. Backup appliance 114 may then read the data from a deduplicated storage system, and communicate it back to the splitter and/or primary storage system.

At block 210, the read data may be transmitted to the requestor. For example, if the read IO came from a host, the data may be communicated back to that host.

Finally, at block 212, the read data may be used to restore the associated region in the LU on the primary storage device. This restore may occur concurrently with sending transmitting the data to the requestor. Restoring the data at this time may be beneficial because it relieves the LU restore process, running in the background, from recovering that region. This allows the data to be transmitted to the primary storage system only once, rather than twice (once in response to the read IO and once for the restore process).

In some embodiments, once the region has been restored it is removed from the difference. For example, once a region is restored a bitmap may flip a bit associated with the region to indicate it is no longer different. This may prevent the background recovery process from attempting to restore that region, and may also prevent future reads from being directed to the data protection appliance.

Returning now to check 206, if the JO is a write, the process continues to check 214.

At check 214, the system determines whether the write JO is aligned with the LU region identified as corrupt. In an embodiment, the write is aligned if it would completely overwrite the region. For example, if the region size is 8 kb and starts at offset 16 kb, and the write is 8 kb long and targeted for offset 16 kb, the write is aligned. Alternatively, if the write is 2 kb long and targeted for offset 16 kb, the write is not aligned because it does not address the remaining 6 kb of the region. In some embodiments, the write may cover multiple regions. For example, a write may be 20 kb long and targeted for offset 16 kb, where each region size is 8 kb. In this example, the first two regions may be aligned with the write IO (i.e. the first 16 kb of the write covers the first two regions starting at offset 16 kb and 24 kb), but the last region may not be aligned because it only covers the first 4 kb of that region.

Determining alignment prevents data from being accidently overwritten by the recovery process. If the IO is aligned with one or more regions, it may be transmitted to the primary storage device and applied to those regions at block 204. The difference may removed, such as by flipping a bit in a bit map, and the region may no longer be corrupt. The region is no longer corrupt because the write IO completely overwrote the data in those regions. There is therefore no reason for the background recovery process to restore that region. If the process were to try to restore the region, the new data may be overwritten and the LU may become out of date or corrupt. Removing the difference prevents the recovery process from recovering that region, and therefore prevents the data from being overwritten.

If the write IO, or a portion thereof, is not aligned with an LU region, the process continues to block 216. At block 216, data may be read from the LU backup. The read data may be for the region that is not aligned with the write IO. For example, if the write is for the first 2 kb of a region, and the region is 8 kb in size, the entire 8 kb of data may be read from the backup. Additionally or alternatively, only the 6 kb that will not be over written may be read from the backup. This read may be, for example, similar to the read at block 208.

Once the data is read, it may be restored to the primary storage device at block 218. The difference may then be removed since the data has been restored, and the process may continue to block 220.

At block 220, the write IO may be executed on the primary storage system. Since the data has been restored, the IO may be applied even though it is not aligned. For example, if the write may overwrite the first 2 kb of the region. The first 2 kb are therefore not corrupt. The remaining 6 kb were just restored from the backup, so they are also not corrupt.

In some embodiments, the IOs may be applied to a LU snapshot rather than the LU itself. For example, returning to FIG. 1, LU snapshot 122 may be taken of LU 106. As IOs are received and processed according to FIG. 2, they may be applied to the snapshot rather than the LU itself. In an embodiment, a background recovery process restores the LU from backup while the IOs are applied to the snapshot. Once the LU restore is complete, the changes in the snapshot may be applied to the LU.

Figure 3:
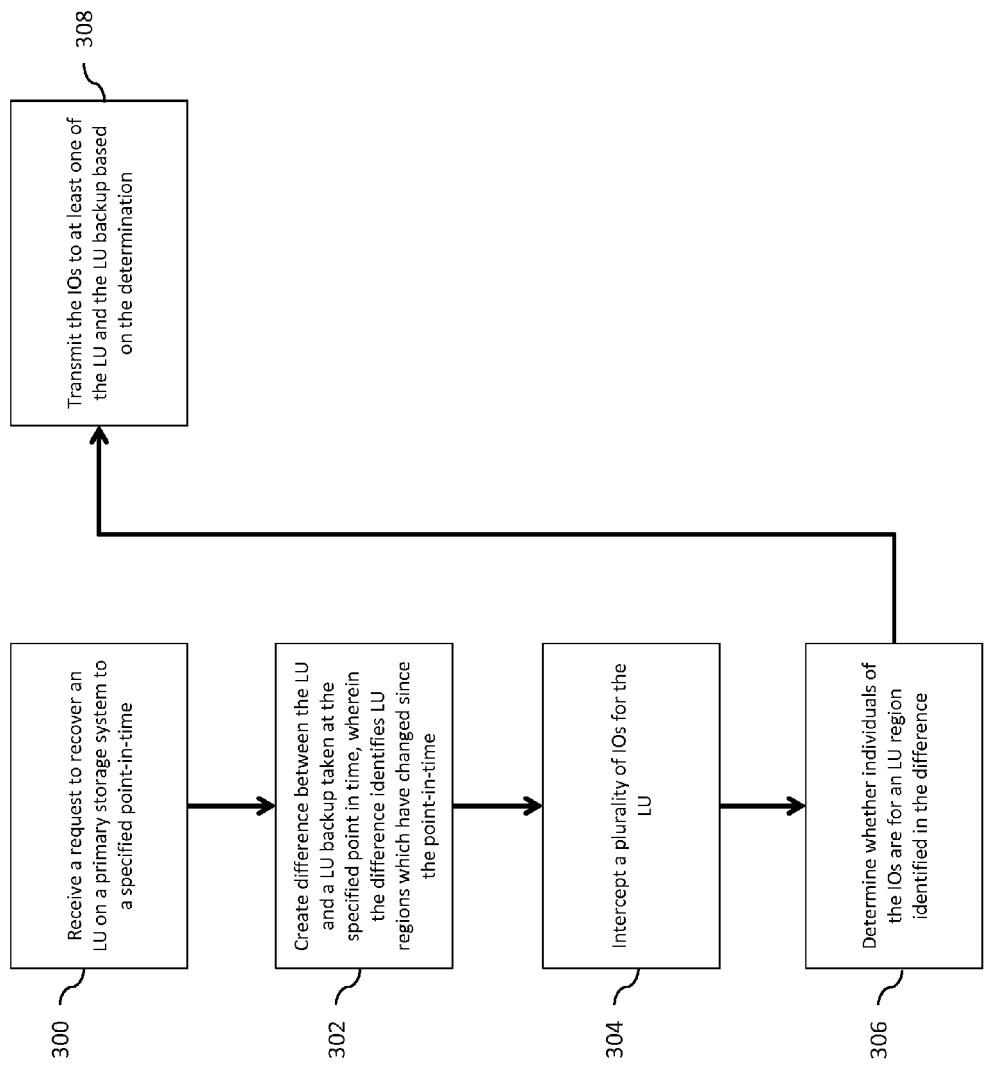
FIG. 3 depicts a process for applying multiple IOs to a LU consistent with an embodiment of the present disclosure.

Turning now to FIG. 3, a process for applying IOs to an LU is discussed. This process may be similar to the process of FIG. 2 operating on the system depicted in FIG. 1.

At block 300, a request may be received to recover an LU on a primary storage system to a specific point-in-time. In an embodiment, the point-in-time may be the latest point-in-time or a past point-in-time.

At 302, a difference between the LU and an LU backup taken at the specified point-in-time may be created. This difference may, for example, identify regions that contain different data between the LU and LU backup, and may therefore be corrupt.

At block 304, a plurality of IOs destined for an LU may be intercepted. These IOs could be, for example, read and/or write requests.

At 306, a check is made to determine if the IOs are for an LU region identified in the difference. For example, the check may determine if the IO is for a region that is corrupt, or if it is for a region that is not corrupt.

Finally, at 308, the IOs may be transmitted to at least one of the LU and the LU backup based on the determination. For example, if the IO is for a region that is not corrupt, it may be transmitted to the LU. If the IO is for a region that is corrupt, it may be transmitted to the LU and/or the LU backup as discussed in reference to FIG. 2.

Figure 4:
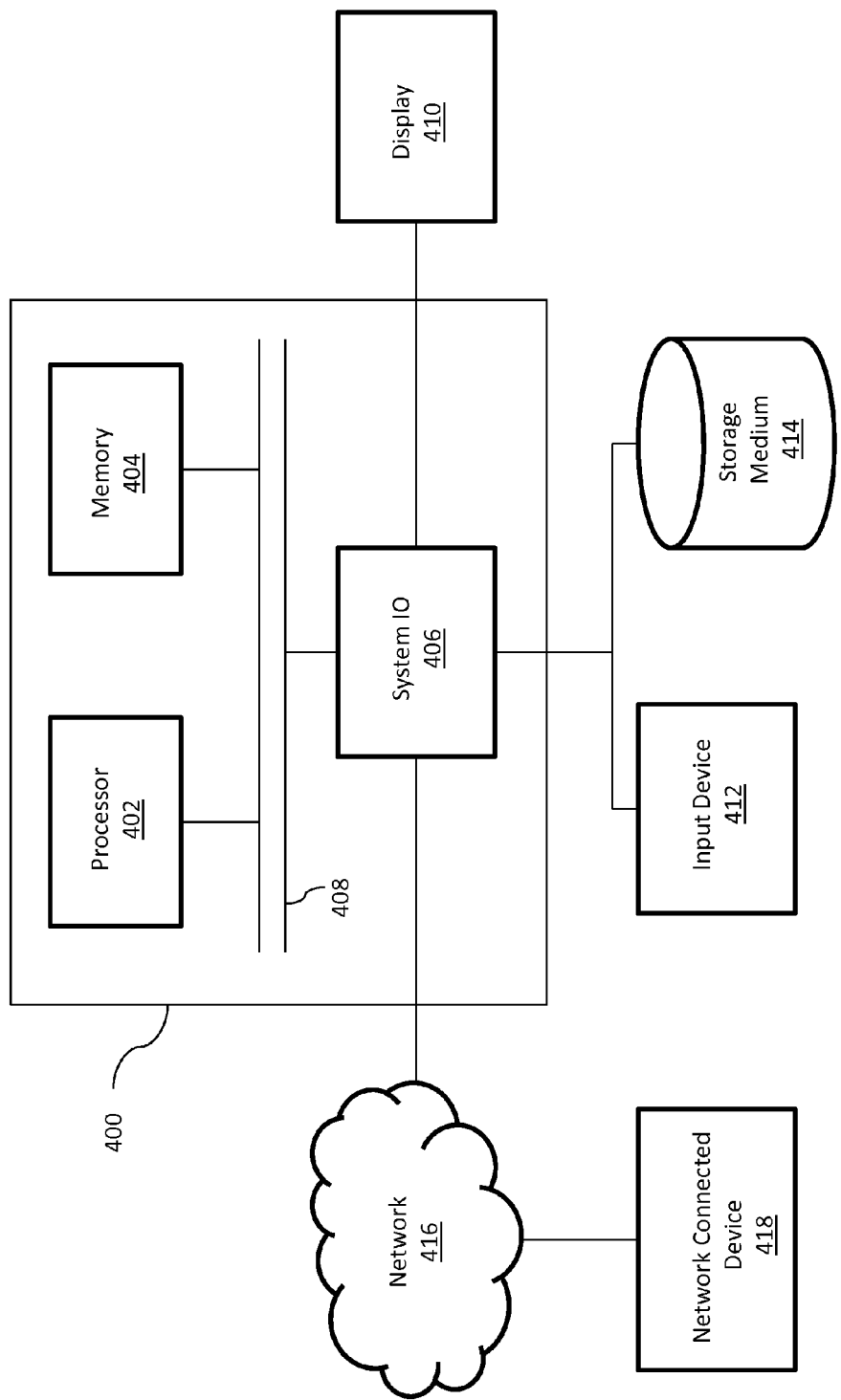
FIG. 4 depicts a general purpose computer system consistent with an embodiment of the present disclosure.

FIG. 4 depicts a computer system which may be used to implement different embodiments discussed herein. General purpose computer 400 may include processor 402, memory 404, and system IO controller 406, all of which may be in communication over system bus 408. In an embodiment, processor 402 may be a central processing unit ("CPU") or accelerated processing unit ("APU"). Some embodiments may comprise multiple processors, or a processor with multiple cores. Processor 402 and memory 404 may together execute a computer process, such as the processes described herein.

System IO controller 406 may be in communication with display 410, input device 412, non-transitory computer readable storage medium 414, and/or network 416. Display 410 may be any computer display, such as a monitor, a smart phone screen, or wearable electronics and/or it may be an input device such as a touch screen. Input device 412 may be a keyboard, mouse, track-pad, camera, microphone, or the like, and storage medium 414 may comprise a hard drive, flash drive, solid state drive, magnetic tape, magnetic disk, optical disk, or any other computer readable and/or writable medium. Storage device 414 may also reside inside general purpose computer 400, rather than outside as shown in FIG. 1.

Network 416 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 416 may be either wired or wireless or any combination thereof, and may provide input to or receive output from IO controller 406. In an embodiment, network 416 may be in communication with one or more network connected devices 418, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for recovering data to a primary storage system, the method comprising:
   receiving a request to recover a logical unit ("LU") on the primary storage system to a specified point-in-time;
   creating a difference between respective snapshot images having pointers to an original volume of the LU and a LU backup taken at the specified point-in-time, wherein the LU backup is stored on a backup storage system, wherein the difference identifies a plurality of LU regions which have changed and contain different data between the LU and the LU backup since the point-in-time;
   intercepting a plurality of read/write request input/outputs ("IOs") for the LU;
   determining whether individuals of the IOs are for an LU region identified in the difference;
   determining whether an individual write request of the write requests is for a LU region identified in the difference; and
   determining whether the individual write request is aligned or not aligned with a region size of the LU region, and if not aligned, reading data associated with the region from the LU backup on the backup storage system, restoring the data to the LU on the primary storage system, and executing the write request on the LU on the primary storage system after the data is restored.

2. The method of claim 1 further comprising communicating the difference to a bitmap comprising a map identifying the regions of the different data.

3. The method of claim 1, further comprising:
   determining at least one of the IOs is for a LU region not identified in the difference; and
   transmitting the at least one of the IOs to the primary storage system.

4. The method of claim 1, further comprising:
   determining at least one of the read requests is for a LU region identified in the difference;
   reading data requested by the at least one of the read requests from the LU backup on the backup storage system;
   transmitting the data to a requestor in response to the at least one of the read requests; and
   restoring the data to the LU on the primary storage system.

5. The method of claim 1, further comprising transmitting the individual write request to the LU on the primary storage system if the request is aligned with the region size.

6. A computer program product for recovering data to a primary storage system, the computer program product comprising a non-transitory computer readable medium encoded with computer executable program, the code enabling:
   receiving a request to recover a logical unit ("LU") on the primary storage system to a specified point-in-time;
   creating a difference between respective snapshot images having pointers to an original volume of the LU and a LU backup taken at the specified point-in-time, wherein the LU backup is stored on a backup storage system, wherein the difference identifies a plurality of LU regions which have changed and contain different data between the LU and the LU backup since the point-in-time;
   intercepting a plurality of read/write request input/outputs ("IOs") for the LU;
   determining whether individuals of the IOs are for an LU region identified in the difference;
   determining whether an individual write request of the write requests is for a LU region identified in the difference; and
   determining whether the individual write request is aligned or not aligned with a region size of the LU region, and if not aligned, reading data associated with the region from the LU backup on the backup storage system, restoring the data to the LU on the primary storage system, and executing the write request on the LU on the primary storage system after the data is restored.

7. The computer program product of claim 6 further comprising communicating the difference to a bitmap comprising a map identifying the regions of the different data.

8. The computer program product of claim 6, further comprising:
   determining at least one of the IOs is for a LU region not identified in the difference; and
   transmitting the at least one of the IOs to the primary storage system.

9. The computer program product of claim 6, further comprising:
   determining at least one of the read requests is for a LU region identified in the difference;
   reading data requested by the at least one of the read requests from the LU backup on the backup storage system; and
   transmitting the data to a requestor in response to the at least one of the read requests; and
   restoring the data to the LU on the primary storage system.

10. The computer program product of claim 6, further comprising transmitting the individual write request to the LU on the primary storage system if the request is aligned with the region size.

11. A system for recovering data, the system comprising:
    a primary storage system comprising a primary storage device and a processor, the processor executing instructions for:
    receiving a request to recover a logical unit ("LU") on the primary storage system to a specified point-in-time;
    creating a difference between respective snapshot images having pointers to an original volume of the LU and a LU backup taken at the specified point-in-time, wherein the LU backup is stored on a backup storage system, wherein the difference identifies a plurality of LU regions which have changed and contain different data between the LU and the LU backup since the point-in-time;
    intercepting a plurality of read/write request input/outputs ("IOs") for the LU;
    determining whether individuals of the IOs are for an LU region identified in the difference;
    determining whether an individual write request of the write requests is for a LU region identified in the difference; and
    determining whether the individual write request is aligned or not aligned, reading data associated with the region from the LU backup on the backup storage system, restoring the data to the LU on the primary storage system, and executing the write request on the LU on the primary storage system after the data is restored; and a deduplicated storage system storing the LU backup.

12. A method for recovering data to a primary storage system, the method comprising:

receiving a request to recover a logical unit ("LU") on the primary storage system to a specified point-in-time;

creating a difference between the LU and a LU backup taken at the specified point-in-time, wherein the LU backup is stored on a backup storage system, wherein the difference identifies a plurality of LU regions which have changed since the point-in-time;

intercepting a plurality of read/write request input/outputs ("IOs") for the LU;

determining whether individuals of the IOs are for an LU region identified in the difference, and whether an individual write request of the write requests is for a LU region identified in the difference;

determining whether the individual write request is aligned with a region size of the LU region, and if so transmitting the individual write request to the LU on the primary storage system; and determining the individual write request is not aligned with the region size, and if so reading data associated with the region from the LU backup on the backup storage system, restoring the data to the LU on the primary storage system, and executing the write request on the LU on the primary storage system after the data is restored.

13. The method of claim 12 further comprising communicating the difference to a bitmap comprising a map identifying the regions of the different data.

* * * * *